(12) United States Patent
Bui et al.

(10) Patent No.: US 6,963,467 B2
(45) Date of Patent: Nov. 8, 2005

(54) METHOD AND APPARATUS FOR COMPENSATING FOR MEDIA SHIFT DUE TO TAPE GUIDE

(75) Inventors: Nhan X. Bui, Tucson, AZ (US); John Alexander Koski, Tuscon, AZ (US); Akimitsu Sasaki, Yokohama (JP); Kazuhiro Tsuruta, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 09/907,306

(22) Filed: Jul. 17, 2001

(65) Prior Publication Data

US 2003/0016467 A1 Jan. 23, 2003

(51) Int. Cl.[7] .................. G11B 5/584; G11B 17/00; G11B 15/48; G11B 15/60
(52) U.S. Cl. .................... 360/77.12; 360/71; 360/74.1; 360/130.21
(58) Field of Search ............... 360/77.12, 74.1, 360/75, 78.02, 130.2, 130.21, 130.3, 69, 71, 73.04, 72.1, 72.3, 73.08; 242/615.4, 346.2; 226/196.1

(56) References Cited

U.S. PATENT DOCUMENTS

| | | | | |
|---|---|---|---|---|
| 3,678,220 A | * | 7/1972 | Luhrs | 360/71 |
| 4,151,566 A | | 4/1979 | Ohrman | 360/72.1 |
| 4,176,381 A | * | 11/1979 | de Niet et al. | 360/77.12 |
| 4,217,615 A | | 8/1980 | Suzuki | 360/137 |
| 4,363,042 A | | 12/1982 | Kimura et al. | 360/71 |
| 4,427,166 A | | 1/1984 | Oishi et al. | 242/199 |
| 4,466,582 A | | 8/1984 | Shiba | 242/197 |
| 4,494,711 A | | 1/1985 | Van Pelt | 242/184 |
| 4,573,619 A | * | 3/1986 | Grant | 242/615.1 |
| 4,913,328 A | * | 4/1990 | Schulz | 226/21 |
| 4,996,611 A | | 2/1991 | Ito | 360/72.3 |
| 5,016,123 A | | 5/1991 | Karsh | 360/69 |
| 5,032,937 A | | 7/1991 | Suzuki et al. | 360/73.06 |
| 5,323,286 A | | 6/1994 | Faul | 360/137 |
| 5,379,165 A | * | 1/1995 | Pahr | 360/78.02 |
| 5,447,279 A | | 9/1995 | Janssen et al. | 242/358 |
| 5,450,257 A | | 9/1995 | Tran et al. | 360/76 |
| 5,532,583 A | | 7/1996 | Davis et al. | 247/202 |
| 5,572,393 A | | 11/1996 | Church et al. | 360/130.21 |
| 5,675,448 A | | 10/1997 | Molstad et al. | 360/77.12 |
| 5,793,573 A | | 8/1998 | Eckberg et al. | 360/106 |
| 5,875,066 A | | 2/1999 | Ottesen | 360/77.11 |
| 5,923,494 A | * | 7/1999 | Arisaka et al. | 360/78.02 |
| 5,995,317 A | | 11/1999 | Ottesen | 360/77.04 |
| 6,018,434 A | | 1/2000 | Saliba | 360/77.13 |
| 6,049,441 A | | 4/2000 | Ottesen | 360/77.04 |
| 6,082,653 A | | 7/2000 | Abedor et al. | 242/357 |
| 6,118,630 A | | 9/2000 | Argumedo | 360/130.21 |
| 2002/0176200 A1 | * | 11/2002 | Trivedi | 360/77.12 |

OTHER PUBLICATIONS

"Position Calibration Tool for Magnetic Moving Tape Drive Heads," IBM, Technical Disclosure Bulletin, vol. 37, No. 09, Sep. 1994, pp. 501–506.
"Capacitive Tape Loop Position Detector," IBM, Technical Disclosure Bulletin, vol. 14, No. 06, Nov. 1971, pp. 1830–1831.
Patent Abstract of Japan (JP58189877) Recording System of Recorder, Hiroyokie, Nov. 5, 1983.

* cited by examiner

Primary Examiner—Andrew L. Sniezek
(74) Attorney, Agent, or Firm—Crawford Maunu PLLC

(57) ABSTRACT

A method and apparatus for compensating for media shift due to spiral groove roller tape guide is disclosed. The lateral tape shift is measured. Then the control of the coarse actuator is adjusted for the lateral tape shift so that the movement of the coarse actuator follows the tape shift.

35 Claims, 5 Drawing Sheets

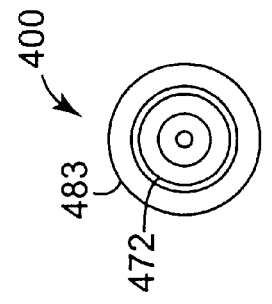
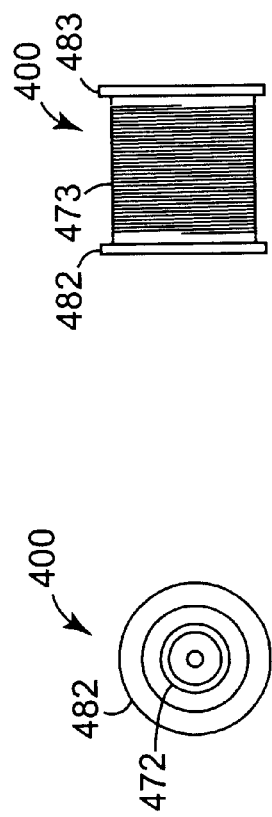
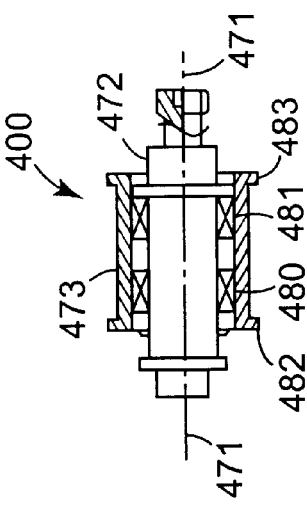
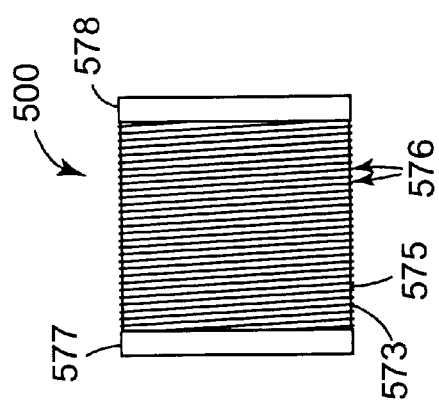

METHOD AND APPARATUS FOR COMPENSATING FOR MEDIA SHIFT DUE TO TAPE GUIDE

BACKGROUND OF THE INVENTION

1. Field of the Invention

This invention relates in general to track following servo control for data storage systems, and more particularly to a method and apparatus for compensating for lateral media shift resulting in forward to backward offset in tape guiding.

2. Description of Related Art

Due to the Internet and the globalization of manufacturing and service-oriented industries, businesses are collecting and analyzing data at an ever increasing rate. As organizations' data warehouses grow, the threat of data loss carries a potentially larger fiscal price. For example, the value of data often exceeds the value of the computer system within weeks of installation of the system. Many factors can cause the loss of data including power brownout, power failure, human error, hard disk failure and other natural disasters. In many cases, the lost data, if not properly backed-up, is simply not recoverable. In other cases, data may still be re-assembled or re-captured from other system either electronically or manually, but both certainly involve a lot of cost and time.

As computing environments have evolved toward data-intensive networks of servers with high system administration costs, the techniques for reliable backup have had to change to meet new needs. The art of data backup has evolved significantly in recent years from individual SCSI drives backing up single computers to automated library systems backing up heterogeneous networks of servers.

Data storage on magnetic tape is well known and tape recorders have been used to record data tracks on magnetic tape. Traditionally, data is recorded in a plurality of parallel data tracks on the magnetic tape. The head is then positioned relative to the tape path by moving the read/write head to different track positions as desired while holding the read/write head stationary. In such a system, the tape tracks must both be sufficiently wide and separated to guarantee that the exposure of the data track to the head is accurate at least to the minimum requirements necessary to reliably read and write the data. The read/write head is positioned at a predetermined fixed point, relative to the magnetic tape path and the data track must accommodate variations of recording track location and tape location variances as the tape feeds past the head. Historically, this accommodation has been accomplished insuring that the track width and the data track separation on the magnetic tape are sufficient for the read/write head to remain positioned over the designated track and at the same time not read magnetically recorded signals from an adjacent track. This arrangement of track width and track separation will accommodate any deviation of the track location from the design norm either due to being recorded on a first recorder and played or rerecorded on a second recorder or due to the wander of the tape as it is spooled past the read/write head from one spool to the other spool of a cartridge.

The definition of the magnetic read/write head and the track width and separations effectively limits the number of data tracks that may be recorded on any given width of tape. Reliance solely on the track width and track separations to insure reliable read/write operations results in a significant waste of magnetic tape surface and thus limits the data density on the tape. Data may be recorded in tracks that are much narrower and still be reliable from a read/write standpoint, but the read/write head must be and remain perfectly aligned with the data track. However, as the track width and the read/write head width narrow in an effort to increase the data capacity of a given tape area, any misalignment of the head with the track may lead to read/write repeatability failures and lost data. Thus, the resolution of the head placement mechanism and the precision of the placement of the tape relative to the read/write head become limiting factors affecting the recording density of data on the magnetic tape surface in tape drives having static read/write heads.

In high track density tape storage devices, a compound actuator is used for track following system. The compound actuator includes a coarse actuator which usually is a stepper motor and a fine actuator which has a linear high bandwidth, limited range of travel. The compound actuator thus has the advantage of high bandwidth and large working dynamic range. Another important aspect of the tape drive is the tape guide which guides the tape over the read/write/servo head in a stable manner to allow reliable track following.

Typically, tape drive systems provide tape guides for controlling the lateral movement of the tape as the tape is moved along a tape path in a longitudinal direction across a tape head. The tape may have a plurality of data tracks extending in the longitudinal direction. More recently, tape drive systems have used a track following servo system for moving the tape head in a lateral direction for following lateral movement of the longitudinal tracks as the tape is moved in the longitudinal direction. The track following servo system may employ servo tracks on the tape which are parallel to the data tracks, and employ servo read heads to read the servo tracks to detect position error and thereby position the tape head at the data tracks and follow the data tracks. This allows the data tracks to be placed closely together and increase the number of data tracks.

The tape is typically contained in a cartridge of one or two reels, and the tape is moved between a supply reel and a take up reel. The reels typically have runout causing the tape to move laterally as the tape is moved longitudinally. Tape guides provide the conventional means for limiting at least the amplitude of the lateral movement of the tape so that it does not exceed the lateral movement capability of the track following servo system.

Typical tape guides may comprise stationary buttons or edges, or flanges at the side of tape guide rollers, positioned against the edges of the tape to control the amplitude of the lateral movement of the tape. In order to increase the total capacity of a tape, the tape is increasingly made thinner to allow more wraps of tape to fit on a given tape reel. As a result, the tape is very weak in the lateral direction, and can easily be damaged at the edge from the tape guide. Thus, the tape guides are typically positioned at a bearing where the tape assumes a cylindrical shape, thus increasing the tape edge ability to support a load. The bearing is also typically designed to have low friction. This arrangement minimizes the potential to distort the edge of the tape as the guides push against the edges of the tape to move the tape to the center of the bearing to reduce the amplitude of lateral displacement of the tape. One example is illustrated in U.S. Pat. No. 5,447,279, which employs an air bearing to reduce the friction of the bearing for stationary tape guides. Roller bearings may also be utilized for reducing the friction of the bearing while the flanges of the roller bearings push against the edges of the tape. One example of a roller bearing or fixed pin with flanges arranged to have low friction is U.S. Pat. No. 4,427,166. Fixed surfaces may also be arranged to have low friction. One example is described in U.S. Pat. No. 4,466,582, where a synthetic resin or metal coated tape guide bearing has a reduced contact area for the tape to lower the friction between the guide surface and the running tape and allow the flanges to stabilize the tape.

However, when wound on a reel, tape is typically subjected to stack shifts or stagger wraps, in which one wrap of the tape is substantially offset with respect to an adjacent wrap. Thus, as the tape is unwound from the reel, there is a rapid lateral transient shift of the tape. Other common sources of rapid lateral transient shifts include 1) a buckled tape edge in which the tape crawls against a tape guide flange and suddenly shifts laterally back down onto the bearing, 2) a damaged edge of the tape which causes the tape to jump laterally when contacting a tape guide, and 3) when the take up reel or supply reel runout is so significant that the reel flange hits the edge of the tape.

As mentioned above, a servo read/write head positioning drive is now typically incorporated into the tape drive system in order to position the head precisely relative to a moving data track on tape. To provide the locational control of the servo read/write head positioning drive, a magnetic read head gap may be placed at a position relative to a servo track on the tape. Then the read head gap is further moved to detect the edge of the servo control track (servo track) recorded on the tape. The read head will provide signals which may be used to indicate the head location relative to the servo track. By using these signals as a basis, the servo control then may produce a positioning signal to drive a servo positioner. The servo positioner moves the read head, causing the read head to track or follow the edge of the servo control track which has been previously recorded on the tape.

The transient response of the tape head track following servo system typically comprises a high bandwidth for a very limited lateral movement, called "fine" track following, for allowing the tape head to accurately follow small displacements of the tape. Larger movement of the tape head is typically conducted as "coarse" track following, which is also employed to shift the tape head from one set of tracks to another set, and is conducted at a slow rate. The occurrence of a lateral transient shift, however, is so rapid that neither the fine track follower nor the coarse track follower is able to respond, with the result that the tracking error becomes so large that writing must be stopped to prevent overwriting an adjacent track and to insure that the tracking error on read back is not so large as to cause a readback error.

One approach has been to make the tape guide edges or flanges closer together to maintain a pressure on both edges of the tape. However, this tends to stress and damage the edges of the tape, reducing its durability. An attempt at reducing the stress comprises spring loaded tape guides, such as the above-mentioned '279 patent. However, although the amplitude of the tape shift may be reduced somewhat by this approach, the speed of the shift is typically not reduced, and the track following servo error still occurs, reducing the performance of the tape drive.

Various attempts have been made to compensate for tape shifts. For example, a tape movement constraint is provided for a tape drive system which moves a tape longitudinally along a tape path across a tape head, the tape having longitudinal tracks and a tape roller bearing is positioned closely adjacent the tape head. The tape roller is rotatable about a central axis parallel to the cylindrical peripheral surface, allowing the tape freedom of movement in the longitudinal direction. The tape roller bearing has a frictional cylindrical peripheral surface for contacting and engaging the surface of the tape and constraining movement of the tape in the lateral direction, thereby reducing the rate of the lateral transient movement of the tape to allow the track following servo system to follow the reduced rate lateral transient movement of the longitudinal tracks. Any potential air bearing that could form between the surface of the tape and the surface of the roller bearing is collapsed to insure that the roller bearing frictionally contacts and engages the surface of the tape.

Nevertheless, a problem is associated with a tape drive that uses a spiral grooved roller tape guide for controlling lateral tape motion transients in the tape path. The grooved roller has the tendency to bias the media toward the direction of forward spiral. This creates offsets in the tape guiding position that depend on the direction of tape motion. For example the tape is biased down to the bottom flange when the guide is rolling clockwise and biased to the top flange when the guide is rolling counter clockwise. This biasing of tape results in relatively large lateral displacement between forward and backward direction and in the tape drive. This movement could shift the tape servo format completely off of the servo head element resulting in loss of servo signal and ultimately failure in acquiring track lock.

It can be seen that there is a need for a method and apparatus for compensating for media shift due to tape guide.

SUMMARY OF THE INVENTION

To overcome the limitations in the prior art described above, and to overcome other limitations that will become apparent upon reading and understanding the present specification, the present invention discloses a method and apparatus for compensating for media shift due to tape guide.

The present invention solves the above-described problems by first measuring the lateral tape shift and then compensating for this movement by appropriately moving the coarse actuator to follow the tape shift.

A method in accordance with the principles of the present invention includes measuring a lateral tape shift and adjusting the movement of a coarse actuator according to the measured lateral tape shift.

Other embodiments of a method in accordance with the principles of the invention may include alternative or optional additional aspects. One such aspect of a method of the present invention is that the method further includes, prior to measuring a lateral tape shift, initiating tape movement and moving the coarse actuator to a desired track position.

Another aspect of a method of the present invention is that the measuring further includes storing a stepper number representing a position of the coarse actuator in memory, updating a value representing a present position of the coarse actuator and calculating the lateral tape shift.

Another aspect of a method of the present invention is that the updating the value representing a present position of the coarse actuator further includes determining whether the movement of the tape is forward or backward, defining the value representing a present position of the coarse actuator as the difference between a position error signal index and a groove shift value when the movement of the tape is forward and defining the value representing a present position of the coarse actuator as the sum of a position error signal index and a groove shift value when the movement of the tape is backward.

Another aspect of a method of the present invention is that the calculating the lateral tape shift further includes subtracting the stepper number representing the position of the coarse actuator stored in memory from the difference between the position error signal index and the groove shift value when the movement of the tape is forward and subtracting the sum of the position error signal index and the groove shift value from the stepper number representing the position of the coarse actuator stored in memory when the movement of the tape is backward.

Another aspect of a method of the present invention is that the groove shift value is calculated by adding half of the average of the forward shift measurements and backward shift measurements over a predetermined number of seeks to a prior groove shift number.

In another embodiment of the present invention a tape drive is provided. The tape drive includes magnetic recording tape having servo signals and data recording thereon, a head for reading signals on the magnetic tape, an actuator for positioning the head relative to the magnetic tape, and a controller for driving the reel motors and processing signals from the head, the controller further comprising a servo system for adjusting movement of the actuator to compensate for lateral shift of the tape, the servo system measuring a lateral tape shift and adjusting the movement of the coarse actuator according to the measured lateral tape shift.

Another aspect of a tape drive of the present invention is that the controller, prior to the servo system measuring a lateral tape shift, initiates tape movement and moves the coarse actuator to a desired track position.

Another aspect of a tape drive of the present invention is that the servo system measures the lateral tape shift by storing a stepper number representing a position of the coarse actuator in memory, updating a value representing a present position of the coarse actuator and calculating the lateral tape shift.

Another aspect of a tape drive of the present invention is that the servo system updates the value representing a present position of the coarse actuator by determining whether the movement of the tape is forward or backward, defining the value representing a present position of the coarse actuator as the difference between a position error signal index and a groove shift value when the movement of the tape is forward and defining the value representing a present position of the coarse actuator as the sum of a position error signal index and a groove shift value when the movement of the tape is backward.

Another aspect of a tape drive of the present invention is that the servo system calculates the lateral tape shift by subtracting the stepper number representing the position of the coarse actuator stored in memory from the difference between the position error signal index and the groove shift value when the movement of the tape is forward and subtracting the sum of the position error signal index and the groove shift value from the stepper number representing the position of the coarse actuator stored in memory when the movement of the tape is backward.

Another aspect of a tape drive of the present invention is that the servo system calculates the groove shift value by adding half of the average of the forward shift measurements and backward shift measurements over a predetermined number of seeks to a prior groove shift number.

In another embodiment of the present invention a tape servo system is provided. The tape servo system includes a fine actuator for moving a head in fine increments relative to a magnetic tape, a coarse actuator for moving a head in coarse increments relative to a magnetic tape, a driver for the fine servo actuator for providing a fine control signal to the fine actuator, a driver for the coarse servo actuator for providing a coarse control signal to the coarse actuator and a servo controller for determining the positioning of the head relative to a magnetic tape, the servo controller adjusting movement of the actuator to compensate for lateral shift of the tape, the servo system measuring a lateral tape shift and adjusting the movement of the coarse actuator according to the measured lateral tape shift.

Another aspect of a tape servo system of the present invention is that the servo system measures the lateral tape shift by storing a stepper number representing a position of the coarse actuator in memory, updating a value representing a present position of the coarse actuator and calculating the lateral tape shift.

Another aspect of a tape servo system of the present invention is that the servo system updates the value representing a present position of the coarse actuator by determining whether the movement of the tape is forward or backward, defining the value representing a present position of the coarse actuator as the difference between a position error signal index and a groove shift value when the movement of the tape is forward and defining the value representing a present position of the coarse actuator as the sum of a position error signal index and a groove shift value when the movement of the tape is backward.

Another aspect of a tape servo system of the present invention is that the servo system calculates the lateral tape shift by subtracting the stepper number representing the position of the coarse actuator stored in memory from the difference between the position error signal index and the groove shift value when the movement of the tape is forward and subtracting the sum of the position error signal index and the groove shift value from the stepper number representing the position of the coarse actuator stored in memory when the movement of the tape is backward.

Another aspect of a tape servo system of the present invention is that the servo system calculates the groove shift value by adding half of the average of the forward shift measurements and backward shift measurements over a predetermined number of seeks to a prior groove shift number.

In another embodiment of the present invention an article of manufacture comprising a program storage medium readable by a computer is provided. The medium tangibly embodying one or more programs of instructions executable by the computer to perform a method for compensating for media shift due to spiral groove roller tape guide, wherein the method includes measuring a lateral tape shift and adjusting the movement of a coarse actuator according to the measured lateral tape shift.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 4A–D illustrates a first embodiment of a tape roller bearing;

FIG. 5 illustrates a second embodiment of a tape roller bearing; and

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention compensates for media shift due to tape guide. Stepper position information is stored. A shift is measured based upon the position of the stepper, the PES index and a groove shift value. The groove shift value is updated based upon an average of the forward and backward shift.

Figure 1:
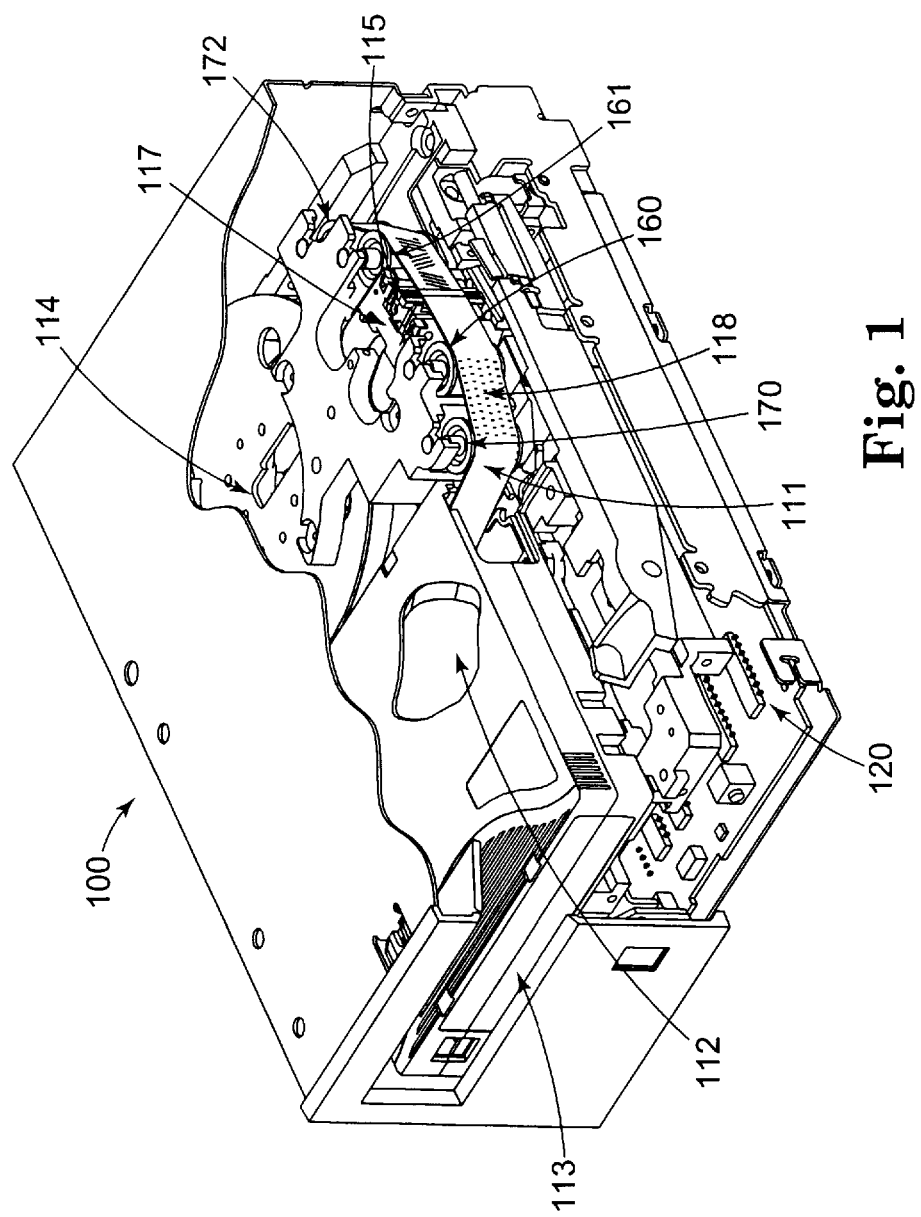
FIG. 1 illustrates a tape drive that implements the present invention.

FIG. 1 illustrates a tape drive 100, such as a magnetic tape drive, which implements the present invention. A magnetic tape 111 is moved along a tape path from a supply reel 112 in a magnetic cartridge 113 to a take up reel 114, the reels comprising drive reels of a drive system operated by drive motors. The magnetic tape is moved along the tape path in a longitudinal direction across a tape head 115. The tape head is supported by an actuator 117 of a servo system, which, for example, may comprise a compound actuator. The tape head 115, for example, a magnetic tape head, may comprise a plurality of read and write elements and a plurality of servo read elements. The tape may comprise a plurality of servo tracks or bands 118 which are recorded on the tape in the longitudinal direction on the tape which are parallel to the data tracks. The servo read elements are part of a track following servo system for moving the tape head 115 in a lateral direction for following lateral movement of the longitudinal tracks as the tape 111 is moved in the longitudinal direction, and thereby position the tape head at the data tracks and follow the data tracks.

The compound actuator may comprise a coarse actuator, such as a stepper motor, and a fine actuator, such as a voice coil, mounted on the coarse actuator. The fine actuator typically has a high bandwidth for a very limited lateral movement, called "fine" track following, for allowing the tape head to accurately follow small displacements of the tape. Larger movement of the tape head is typically conducted by the coarse actuator for centering the actuator at the average position of the fine actuator during track following, and is also employed to shift the tape head from one set of tracks to another set, and is conducted at a slow rate. An example of a compound actuator is described in coassigned U.S. Pat. No. 5,793,573, and those of skill in the art understand that many differing types of actuators may be employed in implementing the present invention.

The tape drive 100 additionally comprises a controller 120 which provides the electronics modules and processor to implement the servo system to operate the compound actuator. The magnetic tape 111 of the present example may be provided in a tape cartridge or cassette 113 having a supply reel 112 or having both the supply and take up reels.

The data tracks are typically narrow and closely spaced, and the tape 111 is typically very thin with little lateral stiffness at the edge. Tape edge guides may be provided which push against the edge of the tape to prevent excessive lateral movement of the tape, for example, from runout of the supply reel 112 or the take up reel 114, at least from the standpoint of the amplitude of the movement of the tape. However, when wound on a reel, tape is typically subjected to rapid lateral transient shifting, for example, from stack shifts or stagger wraps, in which one wrap of the tape is substantially offset with respect to an adjacent wrap. Other common sources of rapid lateral transient shifts include 1) a buckled tape edge in which the tape crawls against a tape guide flange and suddenly shifts laterally back down onto the bearing, 2) a damaged edge of the tape which causes the tape to jump laterally when contacting a tape guide, and 3) when the take up reel or supply reel runout is so significant that the reel flange hits the edge of the tape.

The fine actuator track following typically comprises a high bandwidth for a very limited lateral movement and therefore limited transient response for allowing the tape head to accurately follow small displacements of the tape. The coarse actuator provides larger movement of the tape head for track following, which is also employed to shift the tape head from one set of tracks to another set, and is conducted at a slow rate. However, in prior tape drives, the typical lateral transient shift is so rapid that neither the fine track follower nor the coarse track follower is able to respond, with the result that the tracking error exceeds the allowable threshold, and a PES error occurs.

In accordance with the present invention, tape movement constraint is directed to reducing the rate of the lateral transient movement of the tape so that the track following system may continue to track follow the longitudinal tracks of the tape. Then, the lateral tape shift is measured and the movement of the coarse actuator is adjusted to compensate for the measured lateral tape shift.

The tape movement constraint comprises at least one tape roller bearing 160, 161 for positioning along the tape path closely adjacent the tape head, having a cylindrical peripheral surface parallel to the lateral direction of the tape and extending a length greater than the width of the tape, for contacting a surface of the tape.

Figure 2:
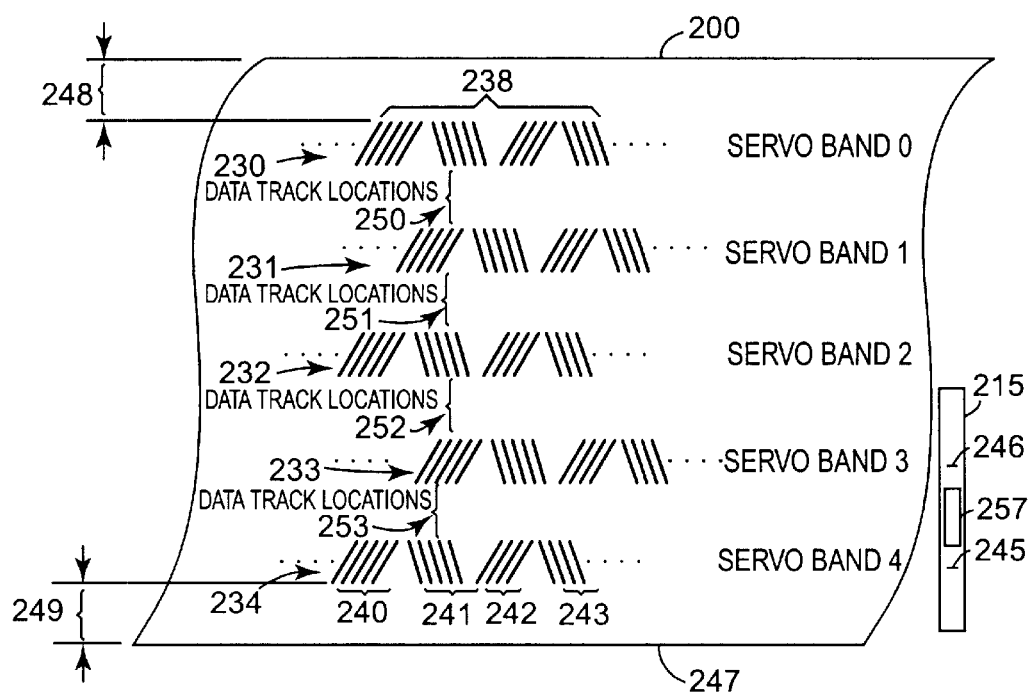
FIG. 2 illustrates one example of a section of a magnetic tape for use in a tape drive according to the present invention.

FIG. 2 illustrates one example of a section of a magnetic tape 200 for use in a tape drive according to the present invention. The servo tracks or bands 230–234 may comprise any of several types of longitudinal servo patterns as is known to those of skill in the art. In the example of FIG. 2, a timing based servo pattern is illustrated, which is described in coassigned U.S. Pat. No. 5,689,384, and which comprises magnetic transitions recorded at more than one azimuthal orientation across the width of the servo track. In the specific example of FIG. 2, five longitudinal timing based servo tracks 230–234 are prerecorded on the magnetic tape 200 for track following at these positions. The pattern of magnetic transitions recorded in the servo tracks is a repeated set of frames 238, each of which are of different azimuthal orientations. In the example of FIG. 2, the tape head 215 comprises at least two narrow servo read elements 245, 246, allowing two servo tracks to be sensed simultaneously, and the outputs used redundantly to reduce error rates.

In the example of FIG. 2, lateral position sensing within a servo track is achieved by deriving a ratio of two servo pattern intervals and is insensitive to tape speed. Specifically, the lateral position may be the ratio of (1) the distance between transitions of bursts 240 and 241, called the "A" distance, to (2) the distance between transitions of bursts 240 and 242, called the "B" distance. Thus, as the tape head servo read elements 245, 246 move toward the edge 247 of the tape 200, the ratio of the distance between the transitions of bursts 240 and 241 to the distance between the transitions of bursts 240 and 242 becomes greater, since the distance between the "A" transitions of bursts 240 and 241 is greater, while the distance between the "B" transitions of bursts 240 and 242 remains unchanged. What is actually measured are time TA and TB between the transitions defining the "A" and "B" distances which vary with tape speed. Since the "B" distance is unchanged at various lateral positions, the ratio TA/TB is the same as "A"/"B" and is insensitive to tape speed. Still referring to FIG. 2, the magnetic tape 200 may be provided with guard bands 248, 249 at the edges of the tape, and four data track regions 250–253 are provided between the servo tracks. A plurality of read and write elements 257 are provided at the tape head 215 for reading and/or writing data on the tape 200. When the servo elements 245, 246 are properly positioned at the specific servo tracks 230–234, the read and write elements 257 are properly positioned to transfer data with respect to the corresponding data track locations of the tape 200.

Figure 3:
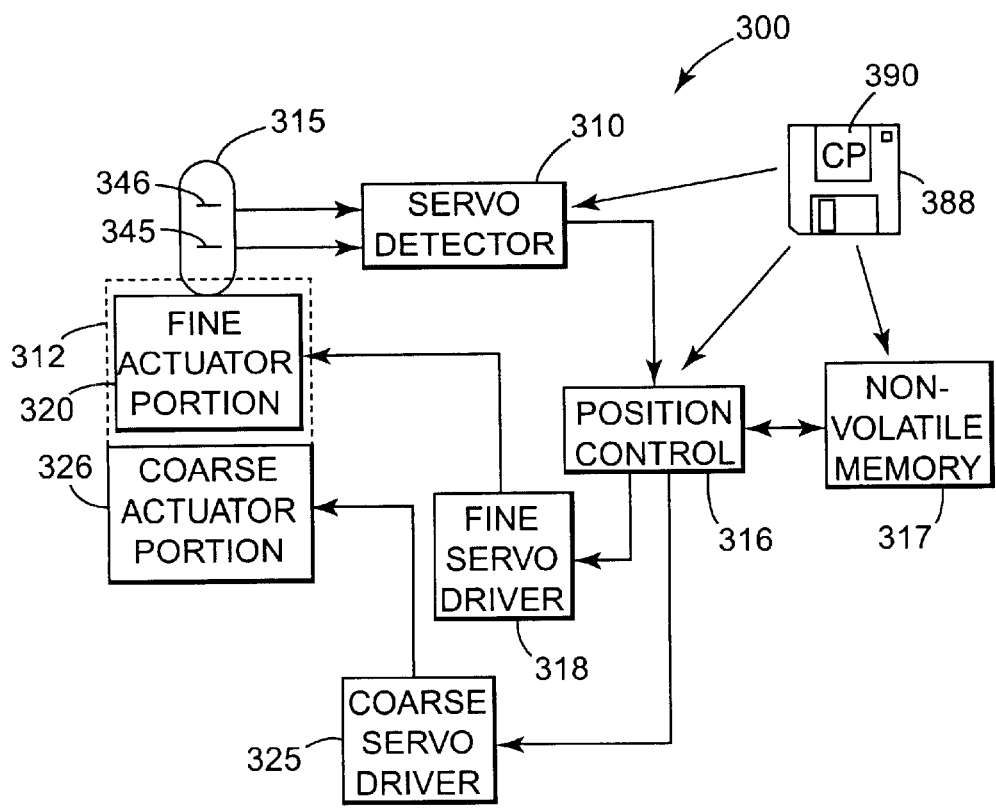
FIG. 3 illustrates a servo system according to the present invention.

FIG. 3 illustrates a servo system 300 according to the present invention. In FIG. 3, a servo detector 310 is coupled to the servo elements 345, 346 of the tape head 315. A position control 316 is provided and may comprise a microprocessor with an attached nonvolatile memory 317 for storing information and programming for the position control. The position control 316 provides, for example, digital servo output data for operating the compound actuator 312. Those of skill in the art will understand that various devices are available to provide the needed signals for the servo detector and position control functions. A fine servo driver 318 converts track following servo output data to the appropriate drive signals for operating a fine actuator portion 320, and a coarse actuator driver 325 converts the coarse servo output data to, for example, appropriate step drive signals for operating a coarse actuator portion 326. The servo detector 310 and drivers 318 and 325 may also comprise electronic modules of the controller 300.

FIGS. 4A–D illustrates a first embodiment of a tape roller bearing 400. The tape roller bearing 400 is rotatable about a central axis 471, for example, of a bearing shaft 472, parallel to the cylindrical peripheral surface 473, allowing the tape freedom of movement in the longitudinal direction.

The cylindrical peripheral surface comprises a frictional surface for contacting and engaging the surface of the tape and constraining movement of the tape in the lateral direction, for example peripheral surface 473, while not increasing friction in the longitudinal direction, thereby reducing the rate of the lateral transient movement of the tape to allow the track following servo system to follow the reduced rate lateral transient movement of the longitudinal tracks.

Thus, the tape is contacted and engaged at its surface rather than at an edge, limiting lateral slip and providing substantial lateral drag to the tape, while the tape rolls freely with the tape roller bearing as the tape roller bearing rotates, substantially altering the transient characteristics of the tape and reducing the rate of the lateral transient movement. Specifically, the cylindrical peripheral surface 473, being rotatable about a central axis 471, prevents an increase in the longitudinal drag on the tape. Thus, undesirable forces and stresses on the tape are prevented. At the same time, as the result of the substantial lateral drag provided by the lateral constraint of the frictional cylindrical peripheral surface 473, the rate of lateral movement is reduced. The fullest reduction in the rate of lateral movement, which assumes no lateral slippage and ideal alignment of the central axis 471, is substantially a of velocity $V_t = V_l \tan \Theta$, where $\Theta$ is the angle the tape edge makes with the direction of the longitudinal velocity, specifically, with a line perpendicular to the central axis 471 of the roller bearing. To move at a high lateral velocity, the tape must overcome the frictional contact of the cylindrical peripheral surface 473. This constraint thereby substantially reduces the lateral velocity of the tape from that which would occur if the tape were free to slide over the bearing surface.

The tape roller bearing 400 is an idler bearing which is rotated by the tape as it is moved longitudinally. The tape roller bearing may rotate on shaft 472 by means of ball bearings 480 and 481, or by an air bearing, or other bearings as are known to those of skill in the art. Flanges 482 and 483 of the embodiment of FIGS. 4A–D may be provided to insure that the tape will not move off the tape roller bearing when the tape tension is reduced or to prevent excessive lateral movement of the tape due to axial misalignment of the tape roller bearing. Hence, the frictional peripheral surface 473 of the tape roller bearing 400 contacts and frictionally engages a tape at its surface, reducing the rate of any lateral transient movement of the tape.

FIG. 5 illustrates a second embodiment of a tape roller bearing 500. In FIG. 5, the flanges are removed, and the smooth cylindrical surfaces 577 and 578 extend to the edges of the tape roller bearing 500. In this embodiment, any excessive amplitude lateral movement could be prevented by conventional tape guiding at adjacent locations.

In the embodiments of FIG. 5, the tape roller bearing frictional cylindrical peripheral surface 573 comprises a plurality of lands 575 separated by grooves 576. The lands extend about the cylindrical peripheral surface 573 in a circumferential direction generally parallel to the longitudinal direction that the tape is moved. Any potential air bearing that could form between the surface of the tape and the surface of the roller bearing, e.g., due to the air drawn along by the tape as it is moved rapidly, is collapsed to provide contact between the tape surface and the lands 575 for engaging the surface of the tape. The lands 575 and grooves 576 extend in the circumferential direction at an angle to the longitudinal direction, thereby forming a helical pattern. As an example, the lands may be as little as 30% of the combined width of a groove and land. The helical pattern of the frictional cylindrical peripheral surface extends laterally a length less than the width of a tape, to prevent generation of a trench into the surface of the tape by any one land, e.g., if the lands were non-helical.

Referring again to FIG. 1, the tape movement constraint comprises at least one tape roller bearing, and preferably comprises two tape roller bearings 160 and 161, positioned along the tape path at either side of and closely adjacent the tape head 115. Alternatively, tape roller bearings 160 and 161 may be located within a removable cartridge, for example, replacing the stationary bearings in an IBM 3570 tape cartridge. When the cartridge is placed in the drive, the tape roller bearings 160 and 161 are positioned along the tape path, and closely adjacent the tape head 115. Elements 170 and 172 may comprise conventional tape guides for reducing the amplitudes of the lateral transient movement, or may comprise additional tape movement constraint roller bearings.

However, as explained above, a problem is associated with a tape drive that uses a spiral grooved roller tape guide 160, 161 for controlling lateral tape motion transients in the tape path. The grooved roller of the spiral grooved roller tape guide 160, 161 has the tendency to bias the media toward the direction of forward spiral. This creates offsets in the tape guiding position that depend on the direction of tape motion. For example the tape is biased down to the bottom flange when the guide 160, 161 is rolling clockwise and biased to the top flange when the guide 160, 161 is rolling counter clockwise. This biasing of tape results in relatively large lateral displacement between forward and backward direction and in the tape drive. This movement could shift the tape servo format completely off of the servo head element resulting in loss of servo signal and ultimately failure in acquiring track lock.

Figure 6:
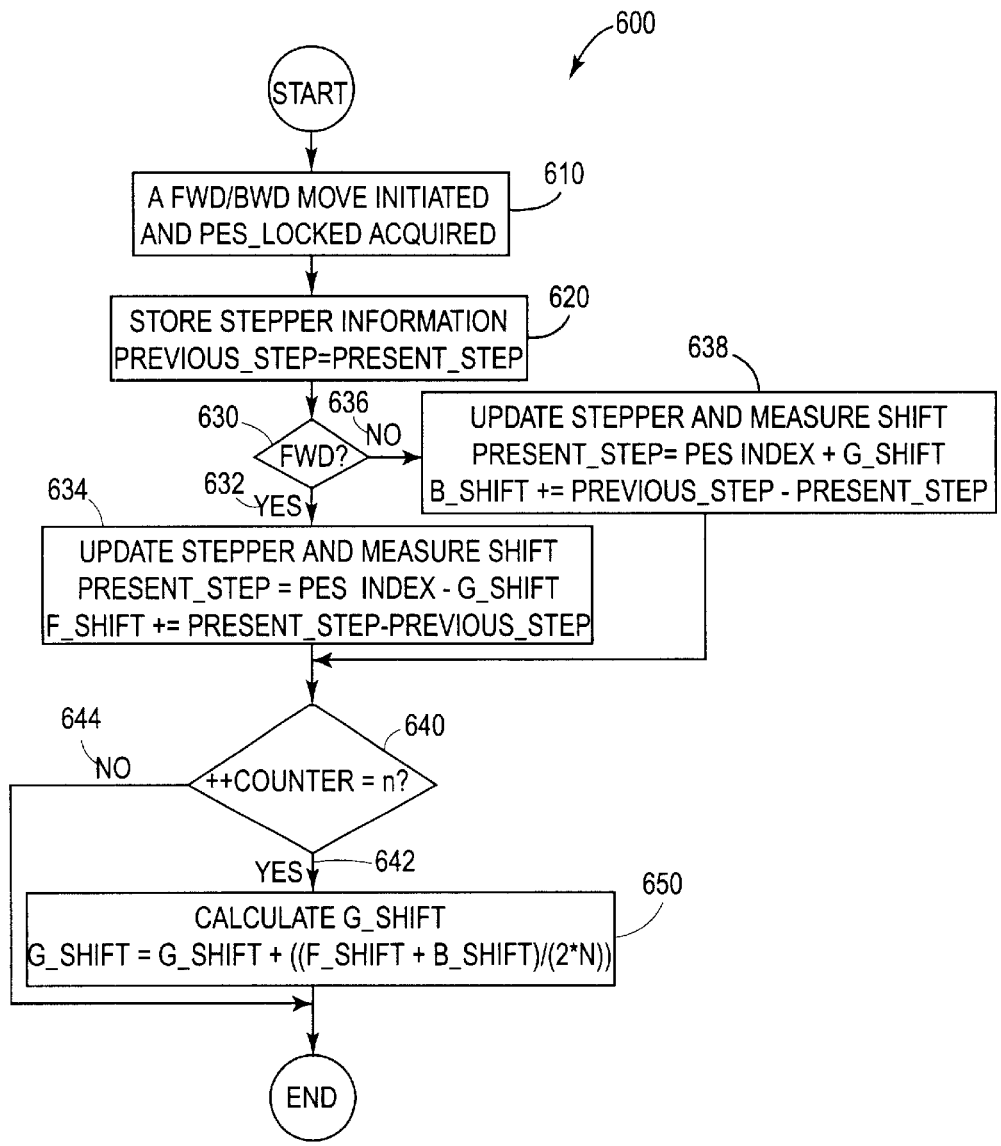
FIG. 6 illustrates a flow chart of a method for compensating for media shift due to spiral groove roller tape guide.

FIG. 6 illustrates a flow chart of a method 600 for compensating for media shift due to spiral groove roller tape guide. In FIG. 6, whenever a command issued that involve a Forward or Backward movement of tape, the tape transport servo will accelerate from stopped to nominal tape speed, at the same time, the track following servo will move the coarse actuator (in this case, the stepper motor) as close as possible to the desire track and then the fine actuator acquired PES lock 610. When the PES lock occurred, the stepper number may or may not be at the stepper number corresponding to the desire track (PES index). This stepper number is stored to a variable call previous step 620. Next, before updating the stepper number to a value corresponding to the PES index, a decision is made whether the move is forward or backward 630. If the move is forward 632, the present step will be updated by the PES index number minus the groove shift number and then the amount of shift is calculated by setting the forward shift equal to the present step value minus the previous step value 634. If the move is backward 636, the present step will be updated by the PES index number plus the groove shift and then the amount of shift is calculated by setting backward shift equal to the previous step minus the present step 638.

After updating and measuring the lateral shift, a counter is incremented and checked for a number of counts (n) 640. If n measurements have been reached 642, the groove shift number will be calculated by taking the average of the forward shift and backward shift and applying half that amount to the groove shift variable 650. If n measurements have not been reached 644, the process ends.

The process illustrated with reference to FIG. 6 may be tangibly embodied in a computer-readable medium or carrier, e.g. one or more of the fixed and/or removable data storage devices 388 illustrated in FIG. 3, or other data storage or data communications devices. The computer program 390 may be loaded into the memory 317 or the position controller 316 of FIG. 1, for execution. The computer program 390 comprise instructions which, when read and executed by the position controller 316 of FIG. 1, causes the tape system 300 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for compensating for media shift due to spiral groove roller tape guide, comprising:

measuring a lateral tape shift; and adjusting the movement of a coarse actuator according to the measured lateral tape shift.

2. The method of claim 1 further comprising, prior to measuring a lateral tape shift, initiating tape movement and moving the coarse actuator to a desired track position.

3. The method of claim 2 wherein the measuring further comprises:

storing a stepper number representing a position of the coarse actuator in memory;

updating a value representing a present position of the coarse actuator; and calculating the lateral tape shift.

4. The method of claim 3 wherein the updating the value representing a present position of the coarse actuator further comprises:

determining whether the movement of the tape is forward or backward;

defining the value representing a present position of the coarse actuator as the difference between a position error signal index and a groove shift value when the movement of the tape is forward; and defining the value representing a present position of the coarse actuator as the sum of a position error signal index and a groove shift value when the movement of the tape is backward.

5. The method of claim 4 wherein the calculating the lateral tape shift further comprises:

subtracting the stepper number representing the position of the coarse actuator stored in memory from the difference between the position error signal index and the groove shift value when the movement of the tape is forward; and subtracting the sum of the position error signal index and the groove shift value from the stepper number representing the position of the coarse actuator stored in memory when the movement of the tape is backward.

6. The method of claim 5 wherein the groove shift value is calculated by adding half of the average of the forward shift measurements and backward shift measurements over a predetermined number of seeks to a prior groove shift number.

7. The method of claim 3 wherein the calculating the lateral tape shift further comprises:

subtracting the stepper number representing the position of the coarse actuator stored in memory from the difference between the position error signal index and the groove shift value when the movement of the tape is forward; and subtracting the sum of the position error signal index and the groove shift value from the stepper number representing the position of the coarse actuator stored in memory when the movement of the tape is backward.

8. The method of claim 7 wherein the groove shift value is calculated by adding half of the average of the forward shift measurements and backward shift measurements over a predetermined number of seeks to a prior groove shift number.

9. The method of claim 1 wherein the measuring further comprises:

storing the stepper number representing a position of the coarse actuator in memory;

updating a value representing a present position of the coarse actuator; and calculating the lateral tape shift.

10. A tape drive, comprising:
- magnetic recording tape having servo signals and data recording thereon;
- a head for reading signals on the magnetic tape;
- a fine and coarse actuator for positioning the head relative to the magnetic tape; and
- a controller for driving a set of reel motors and processing signals from the head, the controller further comprising a servo system for adjusting movement of the actuator to compensate for lateral shift of the tape due to a spiral groove roller tape guide, the servo system measuring a lateral tape shift and adjusting the movement of the coarse actuator according to the measured lateral tape shift.

11. The tape drive of claim 10 wherein the controller, prior to the servo system measuring a lateral tape shift, initiates tape movement and moves the coarse actuator to a desired track position.

12. The tape drive of claim 11 wherein the servo system measures the lateral tape shift by storing a stepper number representing a position of the coarse actuator in memory, updating a value representing a present position of the coarse actuator and calculating the lateral tape shift.

13. The tape drive of claim 12 wherein the servo system updates the value representing a present position of the coarse actuator by determining whether the movement of the tape is forward or backward, defining the value representing a present position of the coarse actuator as the difference between a position error signal index and a groove shift value when the movement of the tape is forward and defining the value representing a present position of the coarse actuator as the sum of a position error signal index and a groove shift value when the movement of the tape is backward.

14. The tape drive of claim 13 wherein the servo system calculates the lateral tape shift by subtracting the stepper number representing the position of the coarse actuator stored in memory from the difference between the position error signal index and the groove shift value when the movement of the tape is forward and subtracting the sum of the position error signal index and the groove shift value from the stepper number representing the position of the coarse actuator stored in memory when the movement of the tape is backward.

15. The tape drive of claim 14 wherein the servo system calculates the groove shift value by adding half of the average of the forward shift measurements and backward shift measurements over a predetermined number of seeks to a prior groove shift number.

16. The tape drive of claim 12 wherein the servo system calculates the lateral tape shift by subtracting the stepper number representing the position of the coarse actuator stored in memory from the difference between a position error signal index and a groove shift value when the movement of the tape is forward and subtracting the sum of the position error signal index and the groove shift value from the stepper number representing the position of the coarse actuator stored in memory when the movement of the tape is backward.

17. The tape drive of claim 16 wherein the servo system calculates the groove shift value by adding half of the average of the forward shift measurements and backward shift measurements over a predetermined number of seeks to a prior groove shift number.

18. The tape drive of claim 10 wherein the servo system measures lateral tape shift by storing the stepper number representing a position of the coarse actuator in memory, updating a value representing a present position of the coarse actuator and calculating the lateral tape shift.

19. A tape servo system, comprising:
- a fine actuator for moving a head in fine increments relative to a magnetic tape;
- a coarse actuator for moving a head in coarse increments relative to a magnetic tape;
- a driver for the fine servo actuator for providing a fine control signal to the fine actuator;
- a driver for the coarse servo actuator for providing a coarse control signal to the coarse actuator; and
- a servo controller for determining the positioning of the head relative to a magnetic tape, the servo controller adjusting movement of the coarse actuator to compensate for lateral shift of the tape due to spiral groove roller tape guide, the servo system measuring a lateral tape shift and adjusting the movement of the coarse actuator according to the measured lateral tape shift.

20. The tape servo system of claim 19 wherein the servo system measures the lateral tape shift by storing a stepper number representing a position of the coarse actuator in memory, updating a value representing a present position of the coarse actuator and calculating the lateral tape shift.

21. The tape servo system of claim 20 wherein the servo system updates the value representing a present position of the coarse actuator by determining whether the movement of the tape is forward or backward, defining the value representing a present position of the coarse actuator as the difference between a position error signal index and a groove shift value when the movement of the tape is forward and defining the value representing a present position of the coarse actuator as the sum of a position error signal index and a groove shift value when the movement of the tape is backward.

22. The tape servo system of claim 21 wherein the servo system calculates the lateral tape shift by subtracting the stepper number representing the position of the coarse actuator stored in memory from the difference between the position error signal index and the groove shift value when the movement of the tape is forward and subtracting the sum of the position error signal index and the groove shift value from the stepper number representing the position of the coarse actuator stored in memory when the movement of the tape is backward.

23. The tape servo system of claim 22 wherein the servo system calculates the groove shift value by adding half of the average of the forward shift measurements and backward shift measurements over a predetermined number of seeks to a prior groove shift number.

24. The tape servo system of claim 20 wherein the servo system calculates the lateral tape shift by subtracting the stepper number representing the position of the coarse actuator stored in memory from the difference between the position error signal index and the groove shift value when the movement of the tape is forward and subtracting the sum of the position error signal index and the groove shift value from the stepper number representing the position of the coarse actuator stored in memory when the movement of the tape is backward.

25. The tape servo system of claim 24 wherein the servo system calculates the groove shift value by adding half of the average of the forward shift measurements and backward shift measurements over a predetermined number of seeks to a prior groove shift number.

26. The tape servo system of claim 19 wherein the servo system measures lateral tape shift by storing the stepper number representing a position of the coarse actuator in memory, updating a value representing a present position of the coarse actuator and calculating the lateral tape shift.

27. An article of manufacture comprising a program storage medium readable by a computer, the medium tangibly embodying one or more programs of instructions executable by the computer to perform a method for compensating for media shift due to spiral groove roller tape guide, the method comprising:

measuring a lateral tape shift; and adjusting the movement of a coarse actuator according to the measured lateral tape shift.

28. The article of manufacture of claim 27 further comprising, prior to measuring a lateral tape shift, initiating tape movement and moving the coarse actuator to a desired track position.

29. The article of manufacture of claim 28 wherein the measuring further comprises:

storing a stepper number representing a position of the coarse actuator in memory;

updating a value representing a present position of the coarse actuator; and calculating the lateral tape shift.

30. The article of manufacture of claim 29 wherein the updating the value representing a present position of the coarse actuator further comprises:

determining whether the movement of the tape is forward or backward;

defining the value representing a present position of the coarse actuator as the difference between a position error signal index and a groove shift value when the movement of the tape is forward; and defining the value representing a present position of the coarse actuator as the sum of a position error signal index and a groove shift value when the movement of the tape is backward.

31. The article of manufacture of claim 30 wherein the calculating the lateral tape shift further comprises:

subtracting the stepper number representing the position of the coarse actuator stored in memory from the difference between the position error signal index and the groove shift value when the movement of the tape is forward; and subtracting the sum of the position error signal index and the groove shift value from the stepper number representing the position of the coarse actuator stored in memory when the movement of the tape is backward.

32. The article of manufacture of claim 31 wherein the groove shift value is calculated by adding half of the average of the forward shift measurements and backward shift measurements over a predetermined number of seeks to a prior groove shift number.

33. The article of manufacture of claim 29 wherein the calculating the lateral tape shift further comprises:

subtracting the stepper number representing the position of the coarse actuator stored in memory from the difference between the position error signal index and the groove shift value when the movement of the tape is forward; and subtracting the sum of the position error signal index and the groove shift value from the stepper number representing the position of the coarse actuator stored in memory when the movement of the tape is backward.

34. The article of manufacture of claim 33 wherein the groove shift value is calculated by adding half of the average of the forward shift measurements and backward shift measurements over a predetermined number of seeks to a prior groove shift number.

35. The article of manufacture of claim 27 wherein the measuring further comprises:

storing the stepper number representing a position of the coarse actuator in memory;

updating a value representing a present position of the coarse actuator; and calculating the lateral tape shift.

* * * * *